US012687262B2

(12) United States Patent
Shao et al.

(10) Patent No.: US 12,687,262 B2
(45) Date of Patent: Jul. 21, 2026

(54) METHODS FOR REGULATING FLOW METERS OF INDUSTRIAL AND COMMERCIAL UNITS OF SMART GAS, INTERNET OF THINGS (IOT) SYSTEMS AND MEDIA THEREOF

(71) Applicant: CHENGDU QINCHUAN IOT TECHNOLOGY CO., LTD., Chengdu (CN)

(72) Inventors: Zehua Shao, Chengdu (CN); Yaqiang Quan, Chengdu (CN); Junyan Zhou, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 226 days.

(21) Appl. No.: 18/435,991

(22) Filed: Feb. 7, 2024

(65) Prior Publication Data

US 2024/0175555 A1     May 30, 2024

(30) Foreign Application Priority Data

Jan. 19, 2024    (CN) ......................... 202410080897.7

(51) Int. Cl.
*F17D 5/06*         (2006.01)
*G01F 15/061*       (2022.01)
*G01F 25/10*        (2022.01)

(52) U.S. Cl.
CPC ............. *F17D 5/06* (2013.01); *G01F 15/061* (2013.01); *G01F 25/15* (2022.01)

(58) Field of Classification Search
CPC .......... F17D 5/06; G01F 15/061; G01F 25/15; G01F 15/063; G06Q 10/06312; G06Q 50/06; G16Y 20/10; G16Y 40/35
See application file for complete search history.

(56) References Cited

U.S. PATENT DOCUMENTS 11,880,255 B1 *  1/2024  Maney .................. G06Q 40/02
2017/0082665 A1 *  3/2017  Bandyopadhyay .... G01R 22/10
(Continued)

FOREIGN PATENT DOCUMENTS

CN        108846528 A      11/2018
CN        111986387 A      11/2020
(Continued)

*Primary Examiner* — Amine Benlagsir
(74) *Attorney, Agent, or Firm* — METIS IP LLC

(57) ABSTRACT

The present invention provides a method for regulating a flow meter of an industrial and commercial unit of smart gas, an Internet of Things (IoT) system and a medium. The method is implemented by a smart gas management platform of an IoT system for regulating a flow meter of an industrial and commercial unit of smart gas, and comprises: obtaining operation data, a time feature, and user feedback data, the operation data including gas usage data and gas outage feedback data of the industrial and commercial unit; determining, based on the operation data, the time feature, and the user feedback data, a gas flow trend of a low balance user; and determining, based on the gas flow trend, the time feature, and the gas outage feedback data, continuous gas supply parameters of the low balance user, the continuous gas supply parameters including at least one of a continuous gas supply quota and a continuous gas supply time.

10 Claims, 4 Drawing Sheets

(56) References Cited

U.S. PATENT DOCUMENTS

| | | | | |
|---|---|---|---|---|
| 2020/0293997 A1* | 9/2020 | Shao | ...................... | G08B 21/18 |
| 2020/0300663 A1* | 9/2020 | Shao | ........................ | G01D 4/02 |
| 2022/0155184 A1* | 5/2022 | Ravi | ....................... | F04B 51/00 |
| 2022/0180453 A1* | 6/2022 | Wada | ..................... | G06Q 50/06 |
| 2023/0162123 A1* | 5/2023 | Kagan | ................... | G06Q 10/04 |
| | | | | 700/286 |
| 2024/0404708 A1* | 12/2024 | Ben-David | ............ | G16H 40/67 |
| 2025/0191086 A1* | 6/2025 | Kaluri | ...................... | G06N 3/08 |

FOREIGN PATENT DOCUMENTS

| | | | |
|---|---|---|---|
| CN | 115456315 A | 12/2022 | |
| CN | 116137456 A | 5/2023 | |
| CN | 116624771 A | 8/2023 | |
| CN | 116644920 A | 8/2023 | |

* cited by examiner

System 100

Process 200

210 obtaining operation data, a time feature, and user feedback data

220 determining, based on the operation data, the time feature, and the user feedback data, a gas flow trend of a low balance user

230 determining, based on the gas flow trend, the time feature, and gas outage feedback data, continuous gas supply parameters of the low balance user Process 300

Process 400

METHODS FOR REGULATING FLOW METERS OF INDUSTRIAL AND COMMERCIAL UNITS OF SMART GAS, INTERNET OF THINGS (IOT) SYSTEMS AND MEDIA THEREOF

CROSS-REFERENCES TO RELATED APPLICATIONS

This application claims priority of Chinese Patent Application No. 202410080897.7, filed on Jan. 19, 2024, the content of which is entirely incorporated herein by reference.

TECHNICAL FIELD

The present disclosure relates to the field of gas flow meter regulation, and in particular to a method for regulating a flow meter of an industrial and commercial unit of smart gas, an Internet of Things (IoT) system and a medium.

BACKGROUND

Gas is widely used in daily life and industrial and commercial production. For industrial and commercial units among gas users, gas consumption is subject to large fluctuations due to outside orders, passenger volume, and other factors. More technical means involving gas consumption assessment are provided in the prior art, but these means are mostly applicable to the assessment of residential users whose gas usage does not fluctuate much, and cannot be applied to industrial and commercial units. In addition, most of gas consumption estimation in the prior art is used in gas safety assessment and gas metering accuracy, and seldomly used in avoiding a gas outage or insufficient gas supply affecting the production and operation of the users. For example, CN112769918A provides a detection system and a detection method for a gas industrial and commercial unit based on IoT, which is often used in the aspects of gas safety assessment and gas metering accuracy, and sometimes fails to fully satisfy the user demands.

Therefore, the present disclosure provides a method for regulating a flow meter of an industrial and commercial unit of smart gas, an IoT system, and a medium, responsive to an application scenario of paying the bill and then using the gas, to provide targeted continuous gas supply parameters, thereby better satisfying the user demands.

SUMMARY

In order to solve the problem of how to provide targeted continuous gas supply parameters, the present disclosure provides a method for regulating a flow meter of an industrial and commercial unit of smart gas, an IoT system, and a medium.

The present disclosure provides a method for regulating a flow meter of an industrial and commercial unit of smart gas. The method may be implemented by a smart gas management platform of an IoT system for regulating a flow meter of an industrial and commercial unit of smart gas, comprising: obtaining operation data, a time feature, and user feedback data, the operation data including gas usage data and gas outage feedback data of the industrial and commercial unit; determining, based on the operation data, the time feature, and the user feedback data, a gas flow trend of a low balance user; and determining, based on the gas flow trend, the time feature, and the gas outage feedback data, continuous gas supply parameters of the low balance user. The continuous gas supply parameters may include at least one of a continuous gas supply quota and a continuous gas supply time.

The present disclosure provides an IoT system for regulating a flow meter of an industrial and commercial unit of smart gas, comprising a smart gas user platform, a smart gas service platform, a smart gas management platform, a smart gas sensor network platform, and a smart gas object platform which interact in sequence. The smart gas management platform may be configured to: obtain operation data, a time feature, and user feedback data, the operation data including gas usage data and gas outage feedback data of the industrial and commercial unit; determine, based on the operation data, the time feature, and the user feedback data, a gas flow trend of a low balance user; and determine, based on the gas flow trend, the time feature, and the gas outage feedback data, continuous gas supply parameters of the low balance user. The continuous gas supply parameters may include at least one of a continuous gas supply quota and a continuous gas supply time.

The present disclosure provides a non-transitory computer-readable storage medium storing computer instructions that, when executed by a computer, may direct the computer to implement the method for regulating the flow meter of the industrial and commercial unit of smart gas of claim 1.

The beneficial effects brought about by the present disclosure include, but are not limited to the following content. (1) The gas flow trend of the low balance user is determined by analyzing the operation data, the time feature, and the user feedback data of the industrial and commercial unit, which can provide targeted continuous gas supply parameters based on different operations and user feedbacks of different industrial and commercial units, thereby ensuring normal operation of the low balance user. (2) A customer flow feature of a future time period is determined based on the operation data, the user feedback data, and the time feature, and then the gas flow trend is determined, which considers actual customer flow features of industrial and commercial units with similar customer flow features, and the user feedback data, thereby determining the more accurate gas flow trend. (3) A planned gas outage time is predicted based on the gas flow trends and the time feature, and then reasonable continuous gas supply parameters are determined, which can provide the industrial and commercial units with the targeted continuous gas supply parameters, thereby satisfying the demands of different users.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein.

DETAILED DESCRIPTION

The accompanying drawings, which are to be used in the description of the embodiments, are briefly described below. The accompanying drawings do not represent the entirety of the embodiments.

It should be understood that "system", "device", "unit" and/or "module" as used herein is a method for distinguishing different components, elements, parts, portions or assemblies of different levels. However, the words may be replaced by other expressions if other words can achieve the same purpose.

As indicated in the disclosure and claims, the terms "a", "an", and/or "the" are not specific to the singular form and may include the plural form unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

When describing the operations performed in the embodiments of the present disclosure in terms of steps, the order of the steps is interchangeable if not otherwise indicated, and the steps are omittable. Other steps may also be included in the process of operation.

Figure 1:
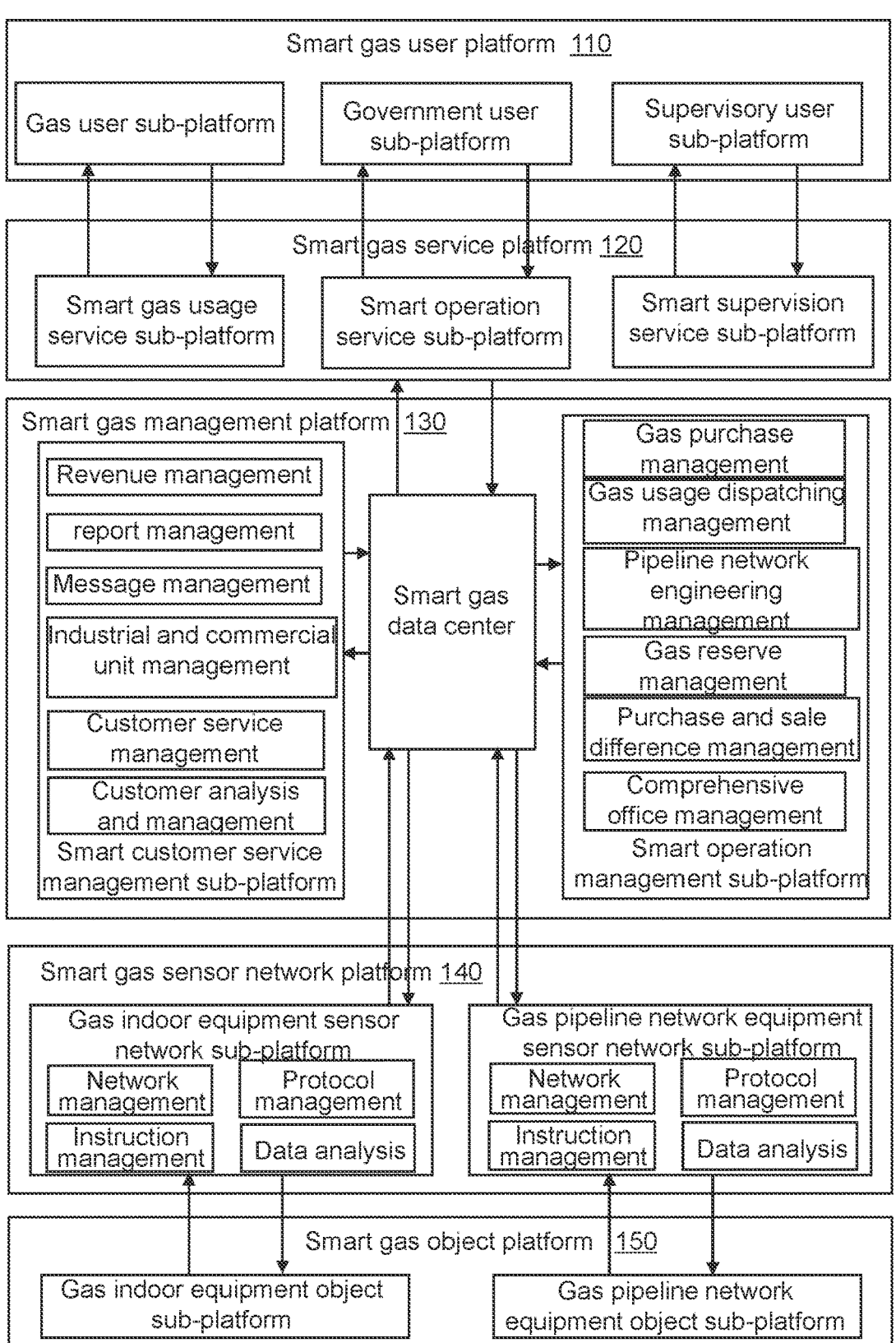
FIG. 1 is a structural diagram illustrating a platform of an Internet of Things (IoT) system for regulating a flow meter of an industrial and commercial unit of smart gas according to some embodiments of the present disclosure.

FIG. 1 is a structural diagram illustrating a platform of an IoT system for regulating a flow meter of an industrial and commercial unit of smart gas according to some embodiments of the present disclosure. The IoT system for regulating the flow meter of the industrial and commercial unit of smart gas provided by the embodiments of the present disclosure will be described in detail below. It should be noted that the following embodiments are only used to explain the present disclosure and do not constitute a limitation of the present disclosure.

In some embodiments, an IoT system 100 for regulating a flow meter of an industrial and commercial unit of smart gas may include a smart gas user platform 110, a smart gas service platform 120, a smart gas management platform 130, a smart gas sensor network platform 140, and a smart gas object platform 150.

The smart gas user platform 110 refers to a platform for interacting with users. In some embodiments, the smart gas user platform 110 may be configured as terminal equipment.

In some embodiments, the smart gas user platform may include a gas user sub-platform, a government user sub-platform, and a supervisory user sub-platform.

The gas user sub-platform refers to a platform that provides gas users with data related to gas usage and solutions to gas problems. The gas users may include an industrial gas user, a commercial gas user, an ordinary gas user, or the like.

The government user sub-platform refers to a platform that provides data related to gas operation for government users. The government users may include a manager (e.g., a manager of an administrative department) of a gas operation entity, or the like.

The supervisory user sub-platform refers to a platform for supervisory users to supervise operation of the entire IoT system. The supervisory users may include a person in a safety management department.

In some embodiments, the smart gas user platform 110 may upload user feedback data to the smart gas management platform 130 via the smart gas service platform 120 based on the gas user sub-platform.

The smart gas service platform 120 refers to a platform for communicating user demands and control information. The smart gas service platform 120 may obtain continuous gas supply parameters, or the like, from the smart gas management platform 130 (e.g., a smart gas data center) and send the continuous gas supply parameters, or the like, to the smart gas user platform 110.

In some embodiments, the smart gas service platform 120 may include a smart gas usage service sub-platform, a smart operation service sub-platform, and a smart supervision service sub-platform.

The smart gas usage service sub-platform refers to a platform that provides the gas users with gas usage services.

The smart operation service sub-platform refers to a platform that provides the government users with information related to gas operation.

The smart supervision service sub-platform refers to a platform that provides supervisory needs for the supervisory users.

In some embodiments, the smart gas service platform 120 may send the continuous gas supply parameters to the supervisory user sub-platform based on the smart supervision service sub-platform.

The smart gas management platform 130 refers to a platform that coordinates and harmonizes connection and collaboration between various functional platforms, aggregates all the information of an IoT, and provides functions of perception management and control management for the IoT operation system.

In some embodiments, the smart gas management platform 130 may include a smart customer service management sub-platform, a smart operation management sub-platform, and a smart gas data center.

The smart gas data center may be configured to store and manage all operation information of the IoT system 100 for regulating the flow meter of the industrial and commercial unit of smart gas. In some embodiments, the smart gas data center may be configured as storage equipment for storing data related to regulation of the flow meter of the industrial and commercial unit, such as operation data, a time feature, and user feedback data, etc.

In some embodiments, the smart gas management platform 130 may perform information interaction with the smart gas service platform 120 and the smart gas sensor network platform 140, respectively, through the smart gas data center. For example, the smart gas data center may send a continuous gas supply program to the smart gas service platform 120. As another example, the smart gas data center may send an instruction to the smart gas sensor network platform 140 to obtain data related to gas equipment.

The smart customer service management sub-platform refers to a platform configured to process information related to the gas users.

In some embodiments, the smart customer service management sub-platform may include, but is not limited to, management modules such as a revenue management module, a report management module, a message management module, an industrial and commercial unit management module, a customer service management module, a customer analysis and management module, etc. The smart customer service management sub-platform may analyze and process the information related to the gas users through the management modules.

The smart operation management sub-platform refers to a platform configured to manage information related to operation of the gas equipment.

In some embodiments, the smart operation management sub-platform may include, but is not limited to, a gas purchase management module, a gas usage dispatching management module, a pipeline network engineering management module, a gas reserve management module, a purchase and sale difference management module, a comprehensive office management module, etc. The smart operation management sub-platform may analyze and process information related to the operation of the gas equipment through the management modules.

In some embodiments, a bidirectional interaction may be performed between the smart customer service management sub-platform and the smart gas data center. The bidirectional interaction may be performed between the smart operation management sub-platform and the smart gas data center. The smart customer service management sub-platform and the smart operation management sub-platform may obtain data from the smart gas data center and feedback corresponding operation information.

The smart gas sensor network platform 140 refers to a functional platform configured to manage sensor communication. In some embodiments, the smart gas sensor network platform 140 may realize functions of perception information sensor communication and control information sensor communication.

In some embodiments, the smart gas sensor network platform 140 may include a gas indoor equipment sensor network sub-platform and a gas pipeline network equipment sensor network sub-platform.

The gas indoor equipment sensor network sub-platform refers to a platform configured to obtain operation information of gas indoor equipment.

In some embodiments, the gas indoor equipment sensor network sub-platform may include a network management module, a protocol management module, an instruction management module, a data analysis module, etc.

The gas pipeline network equipment sensor network sub-platform refers to a platform configured to obtain operation information of gas pipeline network equipment.

In some embodiments, the gas pipeline equipment sensor network sub-platform may include a network management module, a protocol management module, an instruction management module, a data analysis module, etc.

The smart gas object platform 150 refers to a functional platform for sensor information generation and control information execution.

In some embodiments, the smart gas object platform may include, but is not limited to, a gas indoor equipment object sub-platform and a gas pipeline network equipment object sub-platform.

In some embodiments, the gas indoor equipment object sub-platform may be configured as various types of gas indoor equipment of the gas users, e.g., a gas meter, a gas alarm, an indoor gas pipeline, etc.

In some embodiments, the gas pipeline network equipment object sub-platform may be configured as various types of gas pipeline network equipment and monitoring equipment. For example, the various types of gas pipeline network equipment may include an outdoor gas pipeline, valve control equipment, a gas storage tank, pressure regulation equipment, etc. The monitoring equipment may include a gas flow meter, a pressure sensor, a temperature sensor, etc.

According to the IoT system 100 for regulating the flow meter of the industrial and commercial unit of smart gas, a closed loop of information operation may be formed between the smart gas object platform and the smart gas user platform and run regularly under the unified management of the smart gas management platform, thereby realizing the informatization and intellectualization of regulation and management of the flow meter of the industrial and commercial unit of smart gas.

Figure 2:
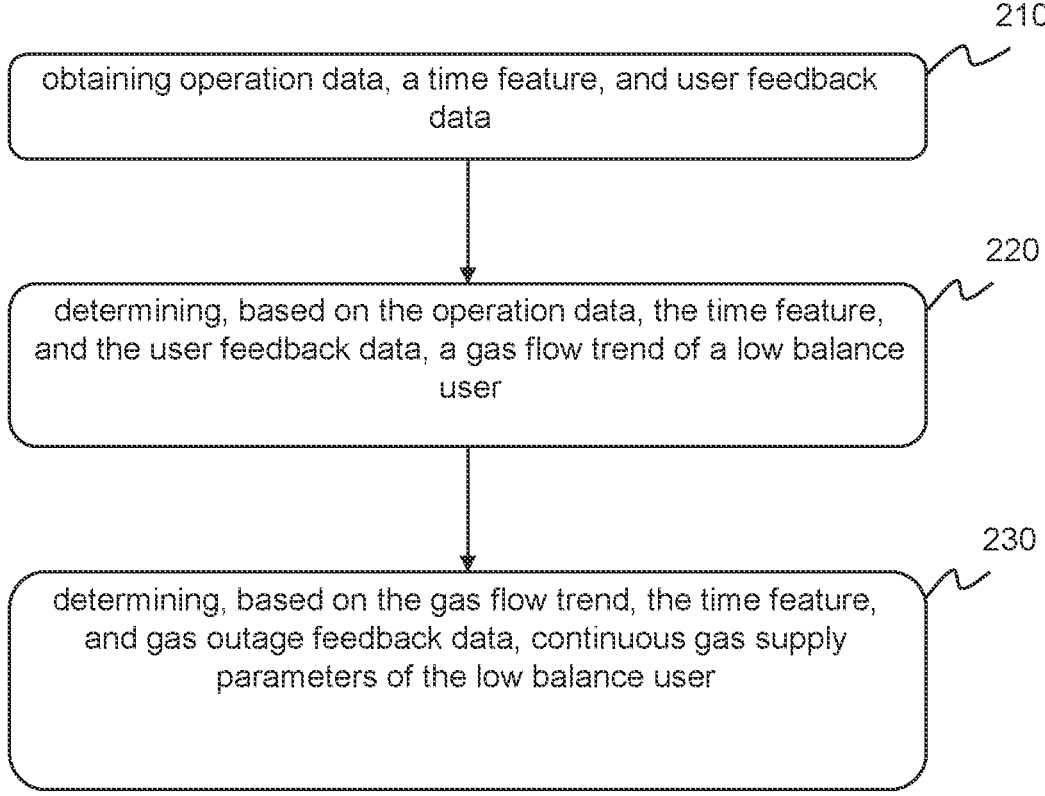
FIG. 2 is a flowchart illustrating an exemplary method for regulating a flow meter of an industrial and commercial unit of smart gas according to some embodiments of the present disclosure.

FIG. 2 is a flowchart illustrating an exemplary method for regulating a flow meter of an industrial and commercial unit of smart gas according to some embodiments of the present disclosure. As illustrated in FIG. 2, a process 200 may include the following operations. In some embodiments, the process 200 may be performed by a smart gas management platform of an IoT system for regulating a flow meter of an industrial and commercial unit of smart gas.

Operation 210, obtaining operation data, a time feature, and user feedback data.

The operation data refers to data related to an operation situation of the industrial and commercial unit, such as a count of users, a user type, a location of users, a customer flow volume, or the like.

In some embodiments, the operation data may include gas usage data and gas outage feedback data of the industrial and commercial unit. The gas usage data refers to data related to gas usage of the industrial and commercial unit, such as a gas pressure, a gas flow rate, or the like. The gas outage feedback data refers to user's feedback on a situation related to gas outage in historical data after user gas outage due to non-payment. For example, the gas outage feedback data may be in the form of a text, a voice, an image, or the like.

In some embodiments, the smart gas management platform may obtain the operation data through a smart gas data center.

The time feature refers to a parameter and/or information that reflects a time-related feature, such as time period information, a season, or the like. The time period information refers to information that reflects a time period in which a current moment is located, such as from 9:00 to 12:00.

In some embodiments, the smart gas management platform may obtain the time features in various ways. For example, the smart gas management platform may obtain the time feature directly from the smart gas data center. As another example, the smart gas management platform may obtain the time feature via the smart gas user platform through the smart gas service platform.

The user feedback data refers to data and/or information fed back by the users, such as the customer flow volume uploaded by the users, estimated gas consumption etc. The estimated gas consumption refers to gas consumption estimated based on an actual situation.

In some embodiments, the smart gas management platform may obtain the user feedback data via the smart gas user platform through the smart gas service platform.

Operation 220, determining, based on the operation data, the time feature, and the user feedback data, a gas flow trend of a low balance user.

The low balance user refers to a user whose gas balance is lower than a balance threshold in a scenario where gas is paid first and then used. The balance threshold may be manually preset. For example, the low balance user may include a user whose paid gas quota is less than 10 $m^3$.

The gas flow trend refers to a gas flow value capable of reflecting a future gas usage trend, such as a gas flow rate of the industrial and commercial unit in a certain future time period.

In some embodiments, the smart gas management platform may determine the gas flow trend in various ways. For example, the smart gas management platform may construct a feature vector based on the operation data, the time feature, and the user feedback data, and match the feature vector to a vector database to obtain the gas flow trend of the low balance user. The vector database may be composed of a plurality of reference vectors. The plurality of reference vectors may be constructed based on historical operation data, historical time features, historical user feedback data, and historical gas flow trends in the historical data. For example, by calculating a distance between the feature vector and the plurality of reference vectors, a gas flow trend corresponding to a reference vector with a smallest distance from the feature vector may be selected as the gas flow trend of the low balance user.

In some embodiments, the smart gas management platform may determine the gas flow trend in other ways. Other embodiments regarding determining the gas flow trends based on the operation data, the time feature, and the user feedback data may be found in FIG. 3 and the related descriptions thereof.

Operation 230, determining, based on the gas flow trend, the time feature, and the gas outage feedback data, continuous gas supply parameters of the low balance user.

The continuous gas supply parameters refer to parameters related to continuous gas supply. The continuous gas supply refers to a situation that when the paid gas quota of the low balance user is used up, the gas still continues to be supplied for a period of time. The continuous gas supply is to provide buffer time to the low balance user in normal operation after the gas is used up. In some embodiments, the continuous gas supply parameters may include at least one of a continuous gas supply quota and a continuous gas supply time.

The continuous gas supply quota refers to a gas quota for the continuous gas supply to the low balance user. In some embodiments, the continuous gas supply quota may be in a time-gas supply distribution, which means different gas supply quotas for different time periods. A duration of each time period may be artificially set, such as (a, b, c, . . . ), wherein a denotes a supply of a L gas in a 0-5 min non-payment time period; b denotes a supply of b L gas in a 5-10 min non-payment time period; and c denotes a supply of c L gas in a 10-15 min non-payment time period. The continuous gas supply time refers to a time when the gas is continuously supplied to the low balance user. For example, the gas supply continues for 24 h after the paid gas quota of the low balance user is used up.

In some embodiments, the smart gas management platform may determine the continuous gas supply parameters of the low balance users based on the gas flow trend, the time feature, and the gas outage feedback data in various ways. For example, the smart gas management platform may determine the continuous gas supply parameters of the low balance user by looking up a table.

In some embodiments, the smart gas management platform may determine the continuous gas supply parameters of the low balance user in other ways. Other embodiments regarding determining the continuous gas supply parameters based on the gas flow trend and the time feature may be found in FIG. 4 and related descriptions thereof.

In some embodiments of the present disclosure, the gas flow trend of the low balance user may be determined by analyzing the operation data, the time feature, and the user feedback data of the industrial and commercial unit, so that targeted continuous gas supply parameters may be provided based on different operation situations and user feedbacks of different industrial and commercial units, thereby ensuring normal operation of the low balance user.

Figure 3:
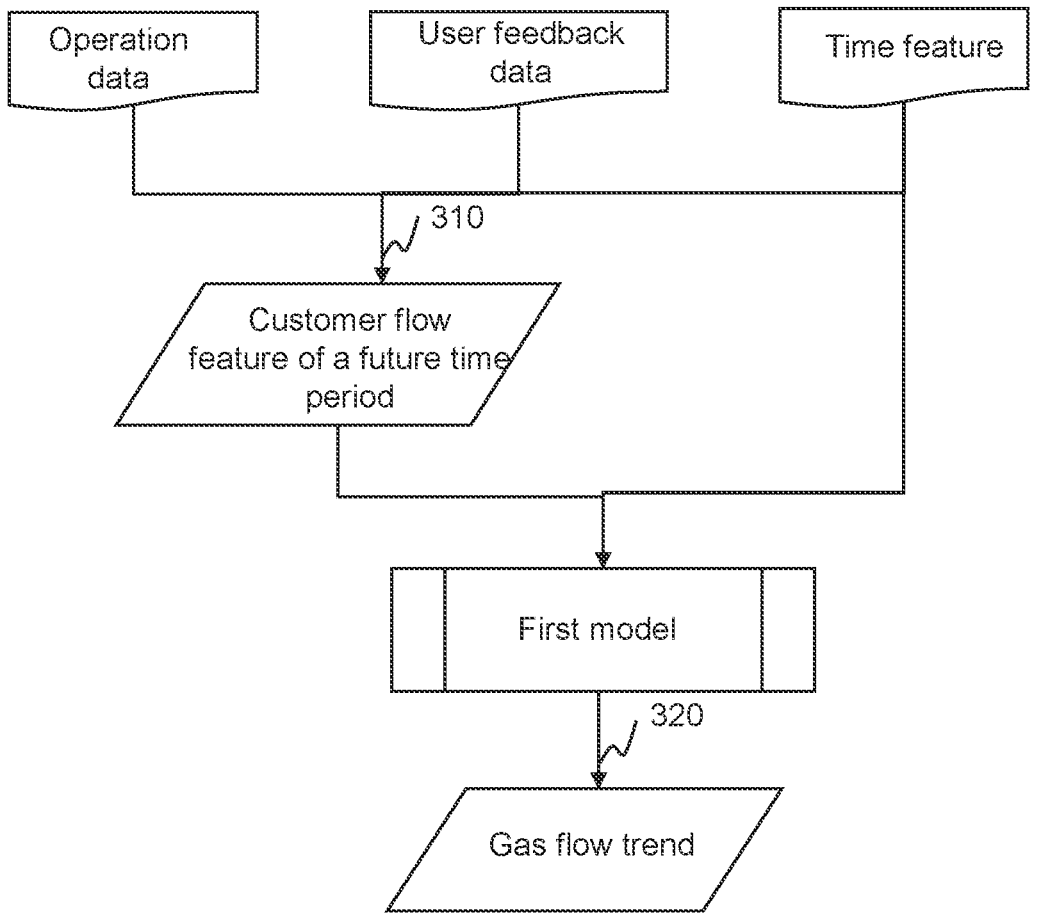
FIG. 3 is a flowchart illustrating an exemplary method for determining a gas flow trend according to some embodiments of the present disclosure.

FIG. 3 is a flowchart illustrating an exemplary method for determining a gas flow trend according to some embodiments of the present disclosure. As illustrated in FIG. 3, a process 300 may include the following operations. In some embodiments, the process 300 may be performed by a smart gas management platform of an IoT system for regulating a flow meter of an industrial and commercial unit of smart gas.

Operation 310, determining, based on operation data, a time feature, and user feedback data, a customer flow feature of a future time period.

The customer flow features of the future time period refer to data capable of reflecting a customer flow volume feature of the industrial and commercial unit in the future time period. For example, a food and beverage merchant may have a customer flow volume of 300 people, and an order volume of 100, etc. The future time period may be predetermined.

In some embodiments, the customer flow feature of the future time period may be determined in various ways. For example, the customer flow feature of the future time period may be obtained by looking up a table. A lookup table containing a correspondence of the operation data, the time feature, and the user feedback data with the customer flow feature of the future time period may be formulated based on historical data.

In some embodiments, the smart gas management platform may determine the customer flow feature of the future time period in other ways. For example, the smart gas management platform may determine a first candidate customer flow feature based on the time feature and the operation data and determine a second candidate customer flow feature based on the user feedback data, and determine the customer flow feature of the future time period based on the first candidate customer flow feature and the second candidate customer flow feature.

The first candidate customer flow feature refers to a customer flow feature determined based on industrial and commercial units with similar customer flow features over a relatively long time scale (e.g., last year). The industrial and commercial units with the similar customer flow features may include industrial and commercial units that are consistent with a business scope of the industrial and commercial unit within a preset distance.

In some embodiments, the smart gas management platform may take an average value of the customer flow features of the industrial and commercial units with the similar customer flow features in a same time period as the first candidate customer flow feature. For example, if the future time period is from 10:00 a.m. to 11:00 a.m. on Jan. 10, 2025, the smart gas management platform may take an average value of 50 customer flow features of 10 industrial and commercial units with similar customer flow features from 10:00 a.m. to 11:00 a.m. from Jan. 5, 2025 to Jan. 9, 2025 as the first candidate customer flow feature.

In some embodiments, the smart gas management platform may determine the first candidate customer flow feature in other ways. For example, a plurality of customer flow feature centers of the future time period may be determined by clustering based on the operation data and the time feature, and the first candidate customer flow feature may be determined based on the plurality of customer flow feature centers.

The plurality of customer flow feature centers refer to customer flow features characterized by clustering centers of clusters obtained through clustering.

In some embodiments, the smart gas management platform may cluster surrounding industrial and commercial units to form a plurality of clusters. Each cluster may correspond to one clustering center, and each clustering center may correspond to one customer flow feature center. For example, the smart gas management platform may determine the customer flow feature centers by clustering through taking actual operation data and actual customer flow features of each industrial and commercial unit within a first preset time period (e.g., last year) as a clustering feature vector of each industrial and commercial unit.

In some embodiments, the smart gas management platform may determine to which of the plurality of clusters a current industrial and commercial unit belongs by calculating a target distance between the current industrial and commercial unit and each of the plurality of clusters, and determine an industrial and commercial unit corresponding to a customer flow feature center of the corresponding cluster, and then determine an actual customer flow feature of the industrial and commercial unit as the first candidate customer flow feature of the industrial and commercial unit.

In some embodiments, for one of the plurality of clusters, the smart gas management platform may calculate the target distance between the current industrial and commercial unit and the cluster by the following operations $S_1$-$S_3$.

Operation $S_1$: the smart gas management platform may obtain actual operation data and an actual customer flow feature of the current industrial and commercial unit in a second preset time period. A first preset time period may be longer than the second preset time period, and the first preset time period and the second preset time period may be historical times.

Operation $S_2$: the smart gas management platform may intercept a candidate time period of any duration of the second preset time period within the first preset time period, and determine the industrial and commercial units corresponding to the customer flow feature center of the cluster, the actual operation data and the actual customer flow feature during the candidate time period, thereby determining a distance between the actual operation data and the actual customer flow feature of the current industrial and commercial unit during the second preset time period and the actual operation data and the actual customer flow feature of the industrial and commercial unit corresponding to the customer flow feature center of the cluster during the candidate time period as a candidate distance. The distance may be a Euclidean distance, a cosine distance, a Mahalanobis distance, a Chebyshev distance, a Manhattan distance, or the like.

Operation $S_3$: the smart gas management platform may execute the operation $S_2$ at least once until an execution completion condition is satisfied.

In some embodiments, the smart gas management platform may determine whether the execution completion condition is satisfied after each execution of $S_2$. The execution completion condition may include a count of executions reaching a maximum value, the candidate distance being less than a preset distance threshold, etc. The preset distance threshold may be artificially set.

In some embodiments, in response to the execution completion condition that the count of executions reaches the maximum value and the execution completion condition is satisfied, the smart gas management platform may take, among the obtained candidate distances, a smallest candidate distance as the target distance between the current industrial and commercial unit and the cluster, and the corresponding candidate time period as a target time period of the current industrial and commercial unit and the cluster.

In some embodiments, in response to the execution completion condition that the candidate distance is less than the preset distance threshold and the execution completion condition is satisfied, the smart gas management platform may determine a last determined candidate distance as a the target distance between the current industrial and commercial unit and the cluster, and the corresponding candidate time period as the target time period of the current industrial and commercial unit and the cluster.

In some embodiments, the smart gas management platform may determine the target distance and the target time period between the current industrial and commercial unit and each cluster by the operations $S_1$-$S_3$, and determine the cluster with the smallest target distance among the target distances between the current industrial and commercial unit and each cluster as a target cluster. The smart gas management platform may determine the industrial and commercial unit corresponding to the customer flow feature center of the target cluster as a target industrial and commercial unit, and determine an actual customer flow feature of the target industrial and commercial unit in a subsequent continuous time period of the target time period as the first candidate customer flow feature of the current industrial and commercial unit. The target time period refers to a candidate time period corresponding to the target distance between the current industrial and commercial unit and the target cluster. A duration of the subsequent continuous time period may be equal to the duration of the future time period.

For example, after the operations $S_1$-$S_3$, the smart gas management platform may determine that the target cluster is a cluster C, and the target industrial and commercial unit is an industrial and commercial unit C. Taking the first preset time period as the last year, and the second preset time period as the last month. If a distance between actual operation data and an actual customer flow feature of the current industrial and commercial unit in the last month and actual operation data and an actual customer flow feature of the industrial and commercial unit C from March 23 to April 23 in the past year is a minimum distance, the smart gas management platform may determine a time period from March 23 to April 23 as the target time period, and the actual customer flow feature of the industrial and commercial unit C in the future time period starting from April 23 as the first candidate customer flow feature of the current industrial and commercial unit.

In some embodiments of the present disclosure, the first candidate customer flow feature may be obtained by considering the actual customer flow feature of the industrial and commercial unit with the similar customer flow features, thereby improving the accuracy of the customer flow feature.

The second candidate customer flow feature refers to a customer flow feature obtained by predicting based on the user feedback data uploaded by the industrial and commercial unit. For example, if a user estimates that 500 people dine or place an order at a store every day, the second candidate customer flow feature may be taken as 500.

In some embodiments, the smart gas management platform may obtain the second candidate customer flow feature through uploading by the industrial and commercial unit or from a third party. For example, the industrial and commercial unit may upload data through the smart gas user platform and then upload the data to the smart gas management platform based on the smart gas service platform.

In some embodiments, the smart gas management platform may obtain the customer flow feature of the future time period based on the first candidate customer flow feature and the second candidate customer flow feature in various ways. For example, the smart gas management platform may obtain the customer flow feature of the future time period by looking up a table. A lookup table may be formulated based on historical data.

In some embodiments, the customer flow feature of the future time period may be proportional to the first candidate customer flow feature and the second candidate customer flow feature. For example, the smart gas management platform may determine the customer flow feature of the future time period by summing the first candidate customer flow feature and the second candidate customer flow feature by weighting. That is, the smart gas management platform may determine the customer flow feature of the future time period using formula (1).

$$\text{customer flow feature of the future time period} = (k_1 \times \text{the first candidate customer flow feature} + k_2 \times \text{the second candidate customer flow feature}) \quad (1)$$

Where $k_1$ and $k_2$ denote coefficients of the first candidate customer flow feature and the second candidate customer flow feature, respectively. Weights may be adjusted based on the customer flow feature of an actual future time period. For example, if the user recently adjusts a gas volume frequently, it indicates that the industrial and commercial unit recently has a business change. Therefore, a customer flow volume estimated by the user may be more accurate, and $k_2$ may be appropriately increased.

In some embodiments of the present disclosure, by controlling the weights of the first candidate customer flow feature and the second candidate customer flow feature in the customer flow feature of the future time period, the customer flow feature of the future time period may be further matched based on an actual business change, making the data more accurate and aligned with a current situation, and better satisfying the user demands.

In some embodiments of the present disclosure, the customer flow feature of the future time period may be determined based on the first candidate customer flow feature and the second candidate customer flow features, which makes the customer flow feature of the future time period more accurate.

Operation 320, determining, based on the customer flow feature of the future time period and the time feature, a gas flow trend.

In some embodiments, the smart gas management platform may determine the gas flow trend in various ways. For example, the smart gas management platform may determine the gas flow trend by looking up a table.

In some embodiments, the smart gas management platform may determine the gas flow trend in other ways. For example, the smart gas management platform may determine the gas flow trend based on the customer flow feature of the future time period and the time feature through a first model. The first model may be a machine learning model.

The first model may be the machine learning model. For example, the first model may include a Convolutional Neural Networks (CNN) model, a Neural Networks (NN) model, another customized model structure, or the like, or any combination thereof. In some embodiments, an input of the first model may include the customer flow feature of the future time period and the time feature, and an output of the first model may include the gas flow trend.

In some embodiments, the first model may be obtained by training based on a large number of first training samples. Each set of the first training samples may include customer flow features of the historical samples between a first historical moment and a second historical moment, and a time feature of the first historical moment. First labels of the first training samples may include actual gas flow trends corresponding to the historical samples between the first historical moment and the second historical moment. The first labels of the first training samples may be obtained based on the historical data. The first historical moment may precede the second historical moment. A duration between the first historical moment and the second historical moment may be duration of the future time period.

In some embodiments of the present disclosure, the gas flow trend may be determined based on the customer flow feature of the future time period and the time feature, thereby obtaining more accurate gas flow trend.

In some embodiments of the present disclosure, the customer flow feature of the future time period may be determined based on the operation data, the user feedback data, and the time feature, and then the gas flow trend may be determined, which considers the actual customer flow features of the industrial and commercial units with similar customer flow features and the user feedback data, thereby determining the more accurate gas flow trend.

Figure 4:
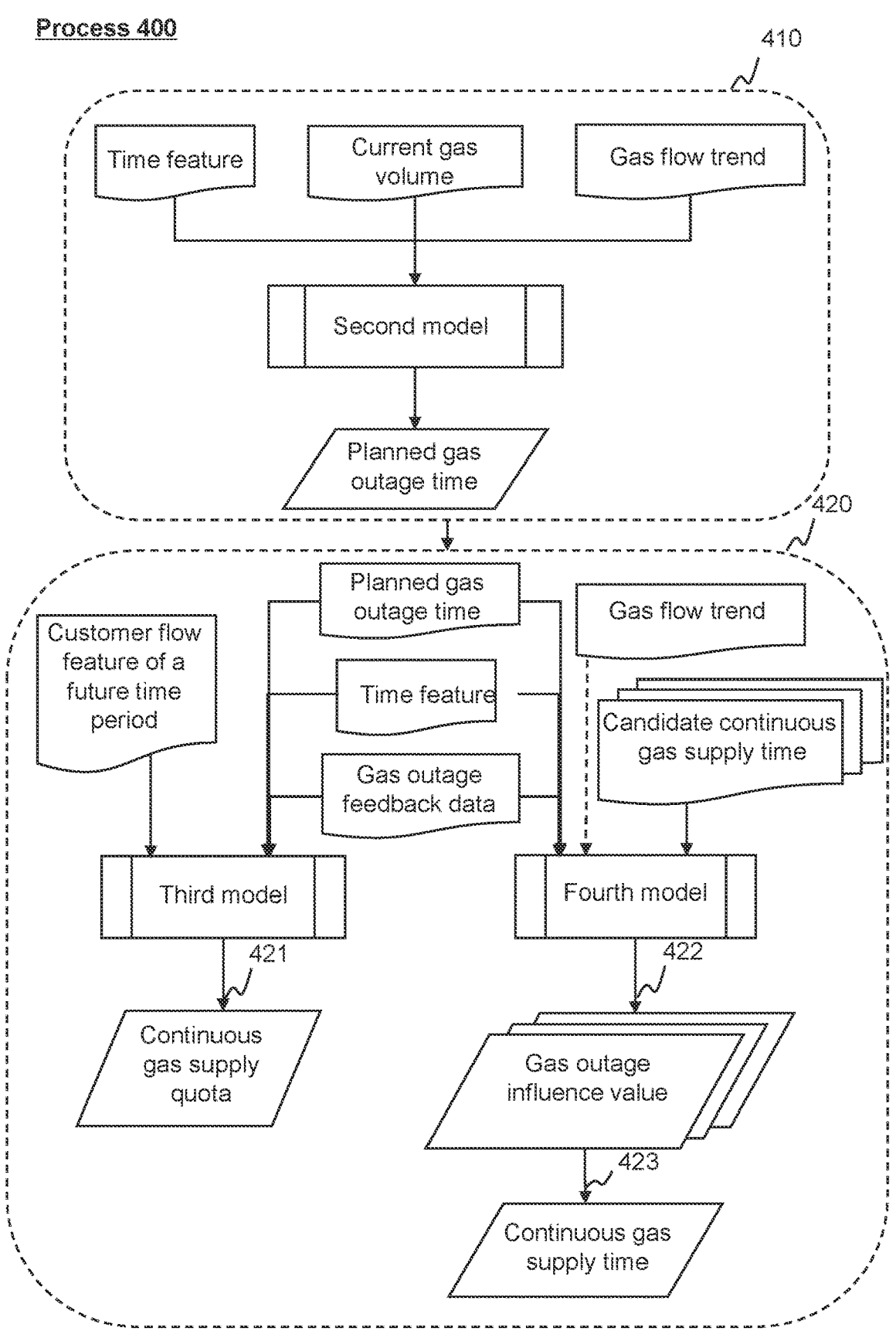
FIG. 4 is a flowchart illustrating an exemplary method for determining continuous gas supply parameters according to some embodiments of the present disclosure.

FIG. 4 is a flowchart illustrating an exemplary method for determining continuous gas supply parameters according to some embodiments of the present disclosure. As illustrated in FIG. 4, a process 400 may include the following operations. In some embodiments, the process 400 may be performed by a smart gas management platform of an IoT system for regulating a flow meter of an industrial and commercial unit of smart gas.

Operation 410, predicting, based on a gas flow trend and a time feature, a planned gas outage time.

The planned gas outage time refers to a time when a low balance user uses up a paid gas quota. For example, if the low balance user has $10\,\text{m}^3$ of gas quota left, the planned gas outage time may be a time point at which the $10\,\text{m}^3$ of gas quota is used up.

In some embodiments, the smart gas management platform may predict the planned gas outage time in various ways based on the gas flow trend and the time feature. For example, the smart gas management platform may statistically count historical gas flow trends, historical time features, and historical planned gas outage times from historical data to form a statistical table. Furthermore, the smart gas management platform may search, based on the gas flow trend and the time feature, the corresponding historical planned gas outage time as a predicted planned gas outage time.

In some embodiments, the smart gas management platform may determine the planned gas outage time through a second model based on a current gas volume, the gas flow trend, and the time feature.

In some embodiments, the second model may be a machine learning model, such as an NN, a CNN, or the like, or any combination thereof. In some embodiments, an input of the second model may include the current gas volume, the gas flow trend, and the time feature; and an output of the second model may include the planned gas outage time.

The current gas volume refers to a current remaining gas quota of the low balance user. For example, if a gas meter currently shows that the remaining gas quota of the low balance user is $10\,\text{m}^3$, the current gas volume may be $10\,\text{m}^3$.

Descriptions regarding the gas flow trend and the time feature may be found in FIG. 2 and the related descriptions thereof.

In some embodiments, the second model may be trained by using second training samples with second labels. The second training samples may include sample gas volumes at historical moments, sample historical gas flow trends, and sample historical time features of sample low balance users. In some embodiments, the second labels may include sample times when the sample low balance users actually use up the paid gas quota.

In some embodiments of the present disclosure, the planned gas outage time may be predicted through the second model, so that the accurate planned gas outage time may be determined while conserving resources and improving the prediction efficiency.

Operation 420, determining, based on the planned gas outage time, the time feature, and gas outage feedback data, continuous gas supply parameters.

In some embodiments, the continuous gas supply parameters may include at least one of a continuous gas supply quota and a continuous gas supply time. More descriptions regarding the continuous gas supply parameters may be found in FIG. 2 and related descriptions thereof.

In some embodiments, the smart gas management platform may determine the continuous gas supply parameters in various ways based on the planned gas outage time, the time feature, and the gas outage feedback data. For example, the smart gas management platform may statistically count historical planned gas outage times, historical time features, historical gas outage feedback data, and historical continuous gas supply parameters from historical data to form a statistical table. Furthermore, the smart gas management platform may search the corresponding historical continuous gas supply parameters in the statistical table as the continuous gas supply parameters based on the planned gas outage time, the time feature, and the gas outage feedback data.

In some embodiments, the smart gas management platform may determine the continuous gas supply quota through operation 421.

Operation 421, determining, based on the planned gas outage time, the time feature, the gas outage feedback data, and a customer flow feature of a future time period, the continuous gas supply quota through a third model.

In some embodiments, the third model may be a machine learning model, such as an NN, a CNN, or the like, or any combination thereof. In some embodiments, an input of the third model may include the planned gas outage time, the time feature, the gas outage feedback data, and the customer flow feature of the future time period; and an output of the third model may include the continuous gas supply quota. More descriptions regarding the continuous gas supply quota, the time feature, and the gas outage feedback data may be found in FIG. 2 and related descriptions thereof. More descriptions regarding the customer flow feature of the future time period may be found in FIG. 3 and related descriptions thereof.

In some embodiments, the third model may be obtained through a training process. In some embodiments, the training process may include: obtaining a plurality of training samples and labels thereof; and obtaining the third model by training an initial third model based on the plurality of training samples and the labels thereof.

In some embodiments, the training samples may include at least sample historical planned gas outage times of sample users at a third historical moment, sample historical time features, sample gas outage feedback data prior to the third historical moment, and sample customer flow features of a time period between the third historical moment and a fourth historical moment in the historical data. In some embodiments, the labels corresponding to the training samples may include gas consumption of the users in each time period between the third historical moment and a fifth historical moment after the historical planned gas outage times. The third historical moment may precede the fifth historical moment, and a duration of the time period between the third historical moment and the fifth historical moment may be the duration of the future time period. The third historical moment may precede the fifth historical moment, and the duration of the time period between the third historical moment and the fifth historical moment may be a first time threshold. The historical planned gas outage times refer to times when the sample users use up the remaining paid gas quota in the historical data.

The first time threshold refers to a time threshold at which gas supply is resumed after the planned gas outage time. The first time threshold may be related to the continuous gas supply time.

Since the first time threshold is configured to control the continuous gas supply time for the user, and the continuous gas supply time is configured to measure the continuous gas supply time for the user, the first time threshold may be related to the continuous gas supply time. In some embodiments, the first time threshold may be positively correlated to the continuous gas supply time. For example, the smart gas management platform may calculate the first time threshold through formula (2). Formula (2) is shown below:

$$\text{First time threshold} = k_3 \times \text{continuous gas supply time} \quad (2)$$

Wherein $k_3$ denotes a coefficient greater than 0, which may be set based on an actual situation or experience.

In some embodiments of the present disclosure, the accuracy and reliability of the trained second model may be improved by setting the first time threshold related to the continuous gas supply time in the training of the second model.

In some embodiments of the present disclosure, the reasonable continuous gas supply quota may be determined while conserving resources and improving test efficiency by determining the continuous gas supply quota through the third model.

In some embodiments, the smart gas management platform may determine the continuous gas supply time through operations 422-423.

Operation 422, determining, based on a candidate continuous gas supply time, the planned gas outage time, the time feature, and the gas outage feedback data, a gas outage influence value.

The candidate continuous gas supply time refers to a candidate time period to be determined as the continuous gas supply time. In some embodiments, the smart gas management platform may look up one or more corresponding historical continuous gas supply times as the candidate continuous gas supply time based on the gas flow trend, the time feature, and the gas outage feedback data. More descriptions regarding searching the historical continuous gas supply times through the statistical table may be found in FIG. 2 and related descriptions thereof.

In some embodiments, the smart gas management platform may also determine a plurality of candidate continuous gas supply times based on a certain step size. For example, if 60 min is determined by looking up the table, and 5 min is used as a step size, a plurality of candidate continuous gas supply times such as 50 min, 55 min, 60 min, 65 min, 70 min, . . . may be determined.

The gas outage influence value refers to a value for assessing how a gas outage affects the user. For example, the gas outage influence value may be expressed as a score or a rating.

In some embodiments, the smart gas management platform may determine the gas outage influence value based on the candidate continuous gas supply time, the planned gas outage time, the time feature, and the gas outage feedback data in various ways. For example, the smart gas management platform may determine one or more corresponding historical gas outage influence values by querying a preset table directly based on the candidate continuous gas supply time, the planned gas outage time, the time feature, and the gas outage feedback data; and use the one or more corresponding historical gas outage influence values as the gas outage influence value. The preset table may be constructed based on the historical continuous gas supply times, the historical planned gas outage times, the historical time features, the historical gas outage feedback data, and the historical gas outage influence values in the historical data.

In some embodiments, the smart gas management platform may determine the gas outage influence value through a fourth model based on the candidate continuous gas supply time, the planned gas outage time, the time feature, and the gas outage feedback data.

The fourth model may be a machine learning model, such as an NN, a CNN, or the like, or any combination thereof. In some embodiments, an input of the fourth model may include the candidate continuous gas supply time, the planned gas outage time, the time feature, and the gas outage feedback data; and an output of the fourth model may include the gas outage influence value corresponding to the candidate continuous gas supply time. The descriptions regarding the time feature and the gas outage feedback data may be found in FIG. 2 and related descriptions thereof.

In some embodiments, the input of the fourth model may also include the gas flow trend. The descriptions regarding the gas flow trend may be found in FIG. 3 and related descriptions thereof.

In some embodiments of the present disclosure, the gas flow trend may be input into the fourth model, which considers that a future change in the gas flow rate may affect the assessment of the gas outage influence value, thereby increasing the reliability and accuracy of the model.

In some embodiments, the fourth model may be trained by third training samples with third labels. The third training samples may include sample historical continuous gas supply times, sample historical planned gas outage times, sample historical time features, and sample historical gas outage feedback data of a sample sixth historical moment. The historical gas outage feedback data refers to gas outage feedback data prior to a sixth historical moment. In some embodiments, the third labels may be labeled based on the gas outage influence values corresponding to the historical continuous gas supply times, which may be determined based on subsequent user feedback. For example, the subsequent user feedback may include a user gas application time and a user attitude feedback score, or the like, after an actual gas outage.

The user gas application time refers to a time when the user applies for gas after the actual gas outage. A standard duration is an average time from an actual gas outage time to a time the user makes the application. The standard duration may reflect a duration for the user to give feedback about a gas demand in general. In general, most users may give feedback on an emergency gas demand, i.e., submit a new gas application, within the standard duration. In some embodiments, the standard duration may be statistically determined.

The user attitude feedback score refers to a user's score for the historical continuous gas supply times.

In some embodiments, the gas outage influence value may be positively correlated to a duration between the user gas application time and the planned gas outage time, the user attitude feedback score, an actual continuous gas supply time, a cost of gas supply per unit of time, and a difference between an actual customer flow volume and an average customer flow volume at a corresponding historical time; and may be negatively correlated to the standard duration.

For example, the smart gas management platform may determine the gas outage influence value based on formula (3). Formula (3) is as follows:

$$\text{gas outage influence value} = w_1 \times (\text{user gas application time} - \text{planned gas outage time})/\text{standard duration} + w_2 \times \text{user attitude feedback score} + w_3 \times \text{actual continuous gas supply time} \times \text{cost of gas supply per unit of time} + w_4 \times (\text{actual customer flow volume} - \text{average customer flow volume at the corresponding historical time}) \quad (3)$$

Wherein $w_1$, $w_2$, $w_3$, and $w_4$ denote coefficients greater than 0, which may be determined based on an actual situation. For example, when a degree of importance of the user is high, $w_1$ and $w_2$ may be appropriately increased; and for strict cost control, $w_3$ may be appropriately increased.

The actual customer flow volume refers to an actual customer flow of the industrial and commercial unit in a current time period. The average customer flow volume at the corresponding historical time refers to an average customer flow volume of the industrial and commercial unit in a plurality of same historical time periods corresponding to the current time period. In some embodiments, the gas outage influence value labeled in the labels may also be related to historical continuous gas supply parameters. For example, if a certain historical continuous gas supply parameter is used, the greater the reduction in the customer flow volume of the industrial and commercial unit, the greater the impact on the user that the implementation of a scheme corresponding to the historical continuous gas supply parameter is considered to be, and the greater the gas outage influence value.

In some embodiments, the fourth term (i.e., $w_4 \times$ (actual customer flow volume − average customer flow volume at the corresponding historical time)) may be excluded from the Formula (3).

In some embodiments of the present disclosure, the gas outage influence value may be assessed through the fourth model, which considers the influence of the user feedback, the customer flow volume, and the gas supply on the gas outage influence value, and leads to a more rapid and accurate assessment of the actual impact of the gas outage on the industrial and commercial unit.

Operation 423, determining, based on the gas outage influence value, the continuous gas supply time.

In some embodiments of the present disclosure, the smart gas management platform may determine the continuous gas supply time based on the gas outage influence value in various ways. For example, a candidate continuous gas supply time corresponding to a smallest gas outage influence value may be determined as a final continuous gas supply time.

In some embodiments of the present disclosure, the continuous gas supply time may be determined by calculating the gas outage influence value, thereby preventing influencing user's business operation due to long time of gas outage.

In some embodiments of the present disclosure, the planned gas outage time may be predicted based on the gas flow trend and the time feature, and then the reasonable continuous gas supply parameters may be determined, providing the industrial and commercial unit with targeted continuous gas supply parameters, thereby satisfying different user demands.

The embodiments of the present disclosure further provide a non-transitory computer-readable storage medium storing computer instructions that, when executed by a computer, may direct the computer to implement the method for regulating the flow meter of the industrial and commercial unit of smart gas described in any of the foregoing embodiments.

The embodiments in the present disclosure are for the purpose of exemplification and illustration only, and do not limit the scope of application of the present disclosure. To those skilled in the art, various amendments and changes that can be made under the guidance of the present disclosure remain within the scope of the present disclosure. For example, the operations 422-423 may be omitted when the continuous gas supply parameters include only the continuous gas supply quota. As another example, the operation 421 may be omitted when the continuous gas supply parameters only include the continuous gas supply time.

The features, structures, or characteristics of one or more embodiments of the present disclosure may be appropriately combined.

In some embodiments, counts describing the quantity of components and attributes are used. It should be understood that such counts used in the description of the embodiments use the modifiers "about", "approximately" or "substantially" in some examples. Unless otherwise stated, "about", "approximately" or "substantially" indicates that the stated figure allows for a variation of ±20%. Accordingly, in some embodiments, the numerical parameters used in the disclosure and claims are approximations that can vary depending upon the desired characteristics of individual embodiments. In some embodiments, numerical parameters should consider the specified significant digits and adopt the general digit retention method. Although the numerical ranges and parameters used in some embodiments of the present disclosure to confirm the breadth of the range are approximations, in specific embodiments, such numerical values are set as precisely as practicable.

In the event of any inconsistency or conflict between the descriptions, definitions, and/or use of terms in the materials cited in this disclosure and those described in this disclosure, the descriptions, definitions, and/or use of terms in the present disclosure shall prevail.

What is claimed is:

1. A method for regulating a flow meter of an industrial and commercial unit of a smart gas, wherein the method is implemented by a smart gas management platform of an Internet of Things (IoT) system comprising:

regulating the flow meter of the industrial and commercial unit of the smart gas, wherein the IoT system further comprises a smart gas user platform, a smart gas service platform, the smart gas management platform, a smart gas sensor network platform, and a smart gas object platform, wherein the smart gas user platform is configured to upload user feedback data to the smart gas management platform via the smart gas service platform based on a gas user sub-platform, and the smart gas service platform is configured to obtain continuous gas supply parameters from the smart gas management platform and send the continuous gas supply parameters to the smart gas user platform, the smart gas object platform comprises a gas pipeline network equipment object sub-platform, the smart gas object platform includes a valve control equipment;

obtaining operation data, a time feature, and the user feedback data, the operation data including gas usage data and gas outage feedback data of the industrial and commercial unit;

determining, based on the operation data, the time feature, and the user feedback data, a gas flow trend of a low balance user; and determining, based on the gas flow trend, the time feature, and the gas outage feedback data, the continuous gas supply parameters of the low balance user, the continuous gas supply parameters including continuous gas supply quota and a continuous gas supply time, wherein the continuous gas supply quota includes gas supply quotas for a plurality of time periods;

predicting, based on the gas flow trend and the time feature, a planned gas outage time;

determining, based on the planned gas outage time, the time feature, and the gas outage feedback data, the continuous gas supply parameters;

determining, based on a candidate continuous gas supply time, the planned gas outage time, the time feature, and the gas outage feedback data, a gas outage influence value, the gas outage influence value refers to a value for assessing how a gas outage affects an user;

determining, based on the candidate continuous gas supply time, the planned gas outage time, the time feature, the gas outage feedback data, and the gas flow trend, the gas flow trend refers to a gas flow value reflecting a future gas usage trend, the gas outage influence value through a first model, wherein the first model is a neural network model, wherein the first model is obtained by a training process using a plurality of training samples with labels, wherein the training samples include sample historical continuous gas supply times, sample historical planned gas outage times, sample historical time features, sample historical gas flow trends, and sample historical gas outage feedback data of a sample historical moment, wherein the historical gas outage feedback data refers to the gas outage feedback data prior to the historical moment, wherein the labels are labeled based on the gas outage influence value corresponding to the historical continuous gas supply times, wherein the gas outage influence value is determined based on subsequent user feedback, wherein the subsequent user feedback includes a user gas application time and a user attitude feedback score after an actual gas outage;

determining, based on the gas outage influence value, the continuous gas supply time; and controlling the smart gas object platform, based on the continuous gas supply parameters, to utilize the valve control equipment to continue supplying gas to the low balance user based on the continuous gas supply quota and the continuous gas supply time;

after a paid gas quota of the low balance user is used up, continuing to supply the gas to the low balance user for a period of time, and allocating different gas supply quotas for the low balance user for different time periods in a time-gas supply distribution, wherein the determining based on the gas flow trend of the low balance user based on the operation data, the time feature, and the user feedback data includes:

determining, based on the operation data, the time feature, and the user feedback data, a customer flow feature of a future time period; and determining, based on the customer flow feature of the future time period and the time feature, the gas flow trend; and wherein the determining, based on the customer flow feature of the future time period and the time feature, the gas flow trend includes:

determining, based on the customer flow feature of the future time period and the time feature, the gas flow trend through a second model, the second model being a machine learning model; and wherein the determining, based on the operation data, the time feature, and the user feedback data, the customer flow feature of the future time period includes:

determining, based on the operation data and the time feature, a first candidate customer flow feature;

determining, based on the user feedback data, a second candidate customer flow feature; and determining, based on the first candidate customer flow feature and the second candidate customer flow feature, the customer flow feature of the future time period; and wherein the determining, based on the first candidate customer flow feature and the second candidate customer flow feature, the customer flow feature of the future time period includes:

determining the customer flow feature of the future time period by performing a weighted summation on the first candidate customer flow feature and the second candidate customer flow feature.

2. The method of claim 1, wherein the determining, based on the operation data and the time feature, the first candidate customer flow feature includes:

determining, based on the operation data and the time feature, a plurality of customer flow feature centers of the future time period by clustering; and determining, based on the plurality of customer flow feature centers of the future time period, the first candidate customer flow feature.

3. The method of claim 2, wherein the determining, based on the operation data and the time feature, the plurality of customer flow feature centers of the future time period by the clustering comprises:

constructing, based on actual operation data and actual customer flow features of a plurality of surrounding industrial and commercial units within a first preset time period, clustering feature vectors corresponding to the plurality of surrounding industrial and commercial units, and performing the clustering on the clustering feature vectors to form a plurality of clusters, wherein each of the plurality of clusters corresponds to a clustering center, and each of the clustering centers corresponds to one of the customer flow feature centers of the future time period;

calculating, based on the actual operation data and the actual customer flow features of a current industrial and commercial unit within a second preset time period, a target distance between the current industrial and commercial unit and each of the plurality of clusters, and determining a target cluster to which the current industrial and commercial unit belongs;

determining, based on a customer flow feature center of the target cluster, a target industrial and commercial unit corresponding to the customer flow feature center, and determining the actual customer flow features of the target industrial and commercial unit in a subsequent continuous time period of a target time period as the first candidate customer flow feature of the current industrial and commercial unit, wherein a duration of the first preset time period is longer than a duration of the second preset time period, and both the first preset time period and the second preset time period are historical time periods.

4. The method of claim 1, wherein the predicting, based on the gas flow trend and the time feature, the planned gas outage time includes:

determining, based on a current gas amount, the gas flow trend, and the time feature, the planned gas outage time through a third model, the third model being the machine learning model.

5. The method of claim 1, wherein the determining, based on the planned gas outage time, the time feature, and the gas outage feedback data, the continuous gas supply parameters includes:

determining, based on the planned gas outage time, the time feature, the gas outage feedback data, and the customer flow feature of the future time period, the continuous gas supply quota through a fourth model, the fourth model being the machine learning model.

6. The method of claim 5, wherein the fourth model is obtained by a training process, and the training process includes:

obtaining the plurality of training samples with the labels, the plurality of training samples including the sample historical planned gas outage times, the sample historical time features, the sample historical gas outage feedback data, and sample historical customer flow features of future time periods, the labels being gas consumption of users at various time periods within a first time threshold after the planned gas outage time of the historical gas outage feedback data, the first time threshold being related to the continuous gas supply time; and obtaining the fourth model by training an initial fourth model based on the plurality of the training samples and the labels thereof.

7. An Internet of Things (IoT) system for regulating a flow meter of an industrial and commercial unit of a smart gas, comprising:

a smart gas user platform, a smart gas service platform, a smart gas management platform, a smart gas sensor network platform, and a smart gas object platform which interact in sequence, wherein the smart gas user platform is configured to upload user feedback data to the smart gas management platform via the smart gas service platform based on a gas user sub-platform, and the smart gas service platform is configured to obtain continuous gas supply parameters from the smart gas management platform and send the continuous gas supply parameters to the smart gas user platform, the smart gas object platform comprises a gas pipeline network equipment object sub-platform, the smart gas object platform includes a valve control equipment, wherein the smart gas management platform is configured to:

obtain operation data, a time feature, and the user feedback data, the operation data including gas usage data and gas outage feedback data of the industrial and commercial unit;

determine, based on the operation data, the time feature, and the user feedback data, a gas flow trend of a low balance user; and determine, based on the gas flow trend, the time feature, and the gas outage feedback data, the continuous gas supply parameters of the low balance user, the continuous gas supply parameters including continuous gas supply quota and a continuous gas supply time, wherein the continuous gas supply quota includes gas supply quotas for a plurality of time periods;

predicting, based on the gas flow trend and the time feature, a planned gas outage time;

determining, based on the planned gas outage time, the time feature, and the gas outage feedback data, the continuous gas supply parameters;

determining, based on a candidate continuous gas supply time, the planned gas outage time, the time feature, and the gas outage feedback data, a gas outage influence value, the gas outage influence value refers to a value for assessing how a gas outage affects an user;

determining, based on the candidate continuous gas supply time, the planned gas outage time, the time feature, the gas outage feedback data, and the gas flow trend, the gas flow trend refers to a gas flow value reflecting a future gas usage trend, the gas outage influence value through a first model, wherein the first model is a neural network model, wherein the first model is obtained by a training process using a plurality of training samples with labels, wherein the training samples include sample historical continuous gas supply times, sample historical planned gas outage times, sample historical time features, sample historical gas flow trends, and sample historical gas outage feedback data of a sample historical moment, wherein the historical gas outage feedback data refers to the gas outage feedback data prior to the historical moment, wherein the labels are labeled based on the gas outage influence value corresponding to the historical continuous gas supply times, wherein the gas outage influence value is determined based on subsequent user feedback, wherein the subsequent user feedback includes a user gas application time and a user attitude feedback score after an actual gas outage;

determining, based on the gas outage influence value, the continuous gas supply time; and controlling the smart gas object platform, based on the continuous gas supply parameters, to utilize the valve control equipment to continue supplying gas to the low balance user based on the continuous gas supply quota and the continuous gas supply time;

after a paid gas quota of the low balance user is used up, continuing to supply the gas to the low balance user for a period of time, and allocating different gas supply quotas for the low balance user for different time periods in a time-gas supply distribution, wherein the determining based on the gas flow trend of the low balance user based on the operation data, the time feature, and the user feedback data includes:

determining, based on the operation data, the time feature, and the user feedback data, a customer flow feature of a future time period; and determining, based on the customer flow feature of the future time period and the time feature, the gas flow trend; and wherein the determining, based on the customer flow feature of the future time period and the time feature, the gas flow trend includes:

determining, based on the customer flow feature of the future time period and the time feature, the gas flow trend through a second model, the second model being a machine learning model; and wherein the determining, based on the operation data, the time feature, and the user feedback data, the customer flow feature of the future time period includes:

determining, based on the operation data and the time feature, a first candidate customer flow feature;

determining, based on the user feedback data, a second candidate customer flow feature; and determining, based on the first candidate customer flow feature and the second candidate customer flow feature, the customer flow feature of the future time period; and wherein the determining, based on the first candidate customer flow feature and the second candidate customer flow feature, the customer flow feature of the future time period includes:

determining the customer flow feature of the future time period by performing a weighted summation on the first candidate customer flow feature and the second candidate customer flow feature.

8. The IoT system of claim 7, wherein the smart gas management platform includes a smart customer service management sub-platform, a smart operation management sub-platform, and a smart gas data center; and the smart customer service management sub-platform performs two-way interaction with the smart gas data center, the smart operation management sub-platform performs two-way interaction with the smart gas data center, and the smart customer service management sub-platform and the smart operation management sub-platform obtain data from the smart gas data center and feedback corresponding operation information.

9. The IoT system of claim 7, wherein the smart gas management platform is further configured to:

determine, based on the operation data and the time feature, a plurality of customer flow feature centers of the future time period by clustering; and determine, based on the plurality of customer flow feature centers of the future time period, the first candidate customer flow feature.

10. A non-transitory computer-readable storage medium storing computer instructions that, when executed by a processor, direct the processor to perform operations comprising:

regulating a flow meter of an industrial and commercial unit of a smart gas, wherein an Internet of Things (IoT) system further comprises a smart gas user platform, a smart gas service platform, a smart gas management platform, a smart gas sensor network platform, and a smart gas object platform, wherein the smart gas user platform is configured to upload user feedback data to the smart gas management platform via the smart gas service platform based on a gas user sub-platform, and the smart gas service platform is configured to obtain continuous gas supply parameters from the smart gas management platform and send the continuous gas supply parameters to the smart gas user platform, the smart gas object platform comprises a gas pipeline network equipment object sub-platform, the smart gas object platform includes a valve control equipment;

obtaining operation data, a time feature, and the user feedback data, the operation data including gas usage data and gas outage feedback data of the industrial and commercial unit;

determining, based on the operation data, the time feature, and the user feedback data, a gas flow trend of a low balance user; and determining, based on the gas flow trend, the time feature, and the gas outage feedback data, the continuous gas supply parameters of the low balance user, the continuous gas supply parameters including continuous gas supply quota and a continuous gas supply time, wherein the continuous gas supply quota includes gas supply quotas for a plurality of time periods;

predicting, based on the gas flow trend and the time feature, a planned gas outage time;

determining, based on the planned gas outage time, the time feature, and the gas outage feedback data, the continuous gas supply parameters;

determining, based on a candidate continuous gas supply time, the planned gas outage time, the time feature, and the gas outage feedback data, a gas outage influence value, the gas outage influence value refers to a value for assessing how a gas outage affects an user;

determining, based on the candidate continuous gas supply time, the planned gas outage time, the time feature, the gas outage feedback data, and the gas flow trend, the gas flow trend refers to a gas flow value reflecting a future gas usage trend, the gas outage influence value through a first model, wherein the first model is a neural network model, wherein the first model is obtained by a training process using a plurality of training samples with labels, wherein the training samples include sample historical continuous gas supply times, sample historical planned gas outage times, sample historical time features, sample historical gas flow trends, and sample historical gas outage feedback data of a sample historical moment, wherein the historical gas outage feedback data refers to the gas outage feedback data prior to the historical moment, wherein the labels are labeled based on the gas outage influence value corresponding to the historical continuous gas supply times, wherein the gas outage influence value is determined based on subsequent user feedback, wherein the subsequent user feedback includes a user gas application time and a user attitude feedback score after an actual gas outage;

determining, based on the gas outage influence value, the continuous gas supply time; and controlling the smart gas object platform, based on the continuous gas supply parameters, to utilize the valve control equipment to continue supplying gas to the low balance user based on the continuous gas supply quota and the continuous gas supply time;

after a paid gas quota of the low balance user is used up, continuing to supply the gas to the low balance user for a period of time, and allocating different gas supply quotas for the low balance user for different time periods in a time-gas supply distribution, wherein the determining based on the gas flow trend of the low balance user based on the operation data, the time feature, and the user feedback data includes:

determining, based on the operation data, the time feature, and the user feedback data, a customer flow feature of a future time period; and determining, based on the customer flow feature of the future time period and the time feature, the gas flow trend; and wherein the determining, based on the customer flow feature of the future time period and the time feature, the gas flow trend includes:

determining, based on the customer flow feature of the future time period and the time feature, the gas flow trend through a second model, the second model being a machine learning model; and wherein the determining, based on the operation data, the time feature, and the user feedback data, the customer flow feature of the future time period includes:

determining, based on the operation data and the time feature, a first candidate customer flow feature;

determining, based on the user feedback data, a second candidate customer flow feature; and determining, based on the first candidate customer flow feature and the second candidate customer flow feature, the customer flow feature of the future time period; and wherein the determining, based on the first candidate customer flow feature and the second candidate customer flow feature, the customer flow feature of the future time period includes:

determining the customer flow feature of the future time period by performing a weighted summation on the first candidate customer flow feature and the second candidate customer flow feature.

\* \* \* \* \*